(12) United States Patent
Evra et al.

(10) Patent No.: US 9,114,883 B2
(45) Date of Patent: Aug. 25, 2015

(54) SYSTEM FOR REAL TIME SIMULATION OF THE ENVIRONMENT OF AN AEROENGINE

(75) Inventors: Yannick Evra, Saint Pe de Bigorre (FR); Jean Michel Py, Pardies Pietat (FR); Pascal Rupert, Lons (FR)

(73) Assignee: TURBOMECA, Bordes (FR)

( * ) Notice: Subject to any disclaimer, the term of this patent is extended or adjusted under 35 U.S.C. 154(b) by 145 days.

(21) Appl. No.: 13/806,432

(22) PCT Filed: Jun. 16, 2011

(86) PCT No.: PCT/FR2011/051378
§ 371 (c)(1),
(2), (4) Date: Apr. 4, 2013

(87) PCT Pub. No.: WO2011/161359
PCT Pub. Date: Dec. 29, 2011

(65) Prior Publication Data
US 2013/0211691 A1    Aug. 15, 2013

(30) Foreign Application Priority Data
Jun. 23, 2010   (FR) ...................... 10 55006

(51) Int. Cl.
*B64D 31/00* (2006.01)
*B64F 5/00* (2006.01)
*G05B 9/02* (2006.01)
(Continued)

(52) U.S. Cl.
CPC ............. *B64D 31/00* (2013.01); *B64F 5/0045* (2013.01); *G05B 9/02* (2013.01); *G05B 17/02* (2013.01); *G05B 19/0423* (2013.01); *G05B 2219/13174* (2013.01); *G05B 2219/13184* (2013.01); *G05B 2219/13186* (2013.01); *G05B 2219/23446* (2013.01); *G05B 2219/24061* (2013.01); *G05B 2219/24062* (2013.01)

(58) Field of Classification Search
CPC ........ B64F 5/0045; B64D 31/00; G05B 9/02; G05B 17/02; G05B 19/0423; G05B 2219/13174; G05B 2219/13186; G05B 2219/23446; G05B 2219/24061; G05B 2219/24062; G05B 2219/13184
USPC ............................................ 701/3–18; 703/7
See application file for complete search history.

(56) References Cited

U.S. PATENT DOCUMENTS

| 5,111,402 A | * | 5/1992 | Brooks et al. ................. 701/29.2 |
| 5,260,874 A | * | 11/1993 | Berner et al. .................... 701/36 |
| 6,647,301 B1 | * | 11/2003 | Sederlund et al. .............. 700/79 |

(Continued)

FOREIGN PATENT DOCUMENTS

| DE | 101 31 317 | 1/2003 |
| EP | 0 650 891 | 5/1995 |
| WO | 2009 113867 | 9/2009 |

OTHER PUBLICATIONS

International Search Report Issued Oct. 7, 2011 in PCT/FR11/051378 Filed Jun. 16, 2011.

*Primary Examiner* — Mary Cheung
*Assistant Examiner* — Atul Trivedi
(74) *Attorney, Agent, or Firm* — Oblon, McClelland, Maier & Neustadt, L.L.P.

(57) ABSTRACT

A system for real time simulation of the environment of an aeroengine includes a digital computer having its inputs switched by a selection module included in the computer either to a respective sensor or else to a substitution digital bus configured to convey substitution digital data generated by a real time simulator.

7 Claims, 2 Drawing Sheets

(51) Int. Cl.
*G05B 17/02* (2006.01)
*G05B 19/042* (2006.01)

(56) References Cited

U.S. PATENT DOCUMENTS

| | | | | |
|---|---|---|---|---|
| 6,735,500 | B2* | 5/2004 | Nicholas et al. | 701/3 |
| 8,145,461 | B2* | 3/2012 | Bourzier | 703/8 |
| 8,380,473 | B2* | 2/2013 | Falangas | 703/8 |
| 8,412,505 | B2* | 4/2013 | Moriyama et al. | 703/13 |
| 2004/0010354 | A1* | 1/2004 | Nicholas et al. | 701/4 |
| 2006/0060694 | A1* | 3/2006 | Nonami et al. | 244/17.13 |
| 2006/0271249 | A1* | 11/2006 | Testrake et al. | 701/3 |
| 2007/0142980 | A1* | 6/2007 | Ausman et al. | 701/3 |
| 2008/0319629 | A1* | 12/2008 | Iraudo | 701/100 |
| 2010/0250051 | A1* | 9/2010 | Nestico et al. | 701/33 |
| 2011/0087474 | A1 | 4/2011 | Paulsen et al. | |
| 2011/0288841 | A1* | 11/2011 | Larsson et al. | 703/8 |

\* cited by examiner

SYSTEM FOR REAL TIME SIMULATION OF THE ENVIRONMENT OF AN AEROENGINE

BACKGROUND OF THE INVENTION

The present invention lies in the field of simulating a complex system in real time.

It applies more particularly to the field of simulating the environment of an engine on board an aircraft, e.g. a helicopter or an airplane.

In general, a simulator seeks to reproduce an environment.

In the field of aviation, simulators are used in particular for research and development of new aircraft and for training crews.

In order to simulate complex systems in real time, one method known as "hardware in the loop" consists in coupling the on-board computer to a tool for simulating the environment of the computer and suitable for providing the computer with data that simulates one or more sensors of the aircraft, the commands generated by the computer being applied as inputs to the simulation tool, which tool is suitable for responding as a function of those commands and for modifying the input data to the computer.

Developing such simulation systems requires specific electronics cards to be developed for generating analog signals associated with each of the simulated sensors, which sensors may be of various different types: temperature sensors, pressure sensors, and speed sensors, in particular.

The fabrication of such electronics cards is expensive and they are complex to maintain, in particular in order to avoid problems of drift.

OBJECT AND SUMMARY OF THE INVENTION

The invention seeks to provide a simulation system that does not present those drawbacks.

More precisely, the invention provides a system having at least one digital computer suitable for controlling an engine in an aircraft, each digital computer comprising:
- at least one input suitable for receiving data representative of the state of a sensor;
- at least one output connected to at least one actuator; and
- a regulation module suitable for sending at least one command over the output bus to the aforesaid actuator as a function of data received by said at least one input.

The system comprises:
- a selection module included in said at least one digital computer and suitable for switching said input either to said sensor or else to a substitution bus as a function of an instruction from an operator;
- a real time simulator for simulating at least some of the environment of the engine and of the aircraft, the simulator comprising:
  - a digital output suitable for sending at least one substitution item of digital data over the substitution bus to the input of the digital computer; and
  - a digital input connected to said at least one output of the digital computer and suitable for receiving the command issued by the digital computer, the real time simulator being designed to simulate the reaction of the engine and of the aircraft to said command; and
- a verification module included in said digital computer, suitable for implementing a verification procedure for preventing the input of the digital computer from being switched to the substitution bus by the selection module when the aircraft is in flight.

In the present specification, a "digital bus" means any type of physical connection over which digital data can be conveyed; for example digital buses that are suitable for use in the invention include buses of the computer area network (CAN), Ethernet, and ARINC types.

In a particular embodiment, the digital input and the digital output of the real time simulator may be physically on the same both-way bus.

Thus, and in most advantageous manner, the invention proposes coupling the digital computer to the simulator by means of a digital bus, rather than using specific cards for simulating the various sensors.

The digital data issued over the bus and simulating the various sensors can be multiplexed.

In accordance with the invention, the selection module and the verification module are included in the digital computer: thus, the code that is used during the simulation stage for testing, is strictly identical to the code included in the aircraft in flight, with only the inputs and outputs of the digital computer being diverted.

In accordance with the invention, the system of the invention includes verification means for guaranteeing that when the aircraft is in flight the inputs of the digital computer are connected to real sensors, in other words, for ensuring that the inputs of the digital computer cannot be connected to the substitution bus.

The verification means of the system of the invention provide the safety that is needed to guarantee that simulation cannot be put into operation accidentally while the aircraft is in operation.

In general, by means of the invention, during a simulation stage and for each of the sensors, an operator can select to switch the inputs of the digital computer either to a real sensor or else to a substitution bus, so that substitution digital data generated in real time by the simulator replaces the data representative of the states of the sensors.

Most advantageously, the digital computer transmits the commands that it generates via the same outputs, regardless of whether it is in simulation mode or not.

In a preferred embodiment of the invention, the system of the invention includes means for connecting or disconnecting the output of the digital computer to or from the input of the regulation module, the output of the digital computer being, in any event, always connected to the actuator.

In a preferred embodiment of the invention, said selection module is implemented by a software module constituting an interface between said at least one input and said regulation module.

Such a software module is known to the person skilled in the art as an application program interface (API).

This embodiment is particularly advantageous since it enables the regulation module to be developed and the digital computer to be certified independently of the real time simulator.

In a preferred embodiment of the invention, the system has two engines, each controlled by a respective digital computer.

This characteristic makes it possible advantageously to simulate the behavior of both engines and of the aircraft.

BRIEF DESCRIPTION OF THE DRAWINGS

Other characteristics and advantages of the present invention appear from the following description made with reference to the accompanying drawings which show an example having no limiting character.

In the drawings.

DETAILED DESCRIPTION OF AN EMBODIMENT

Figure 1:
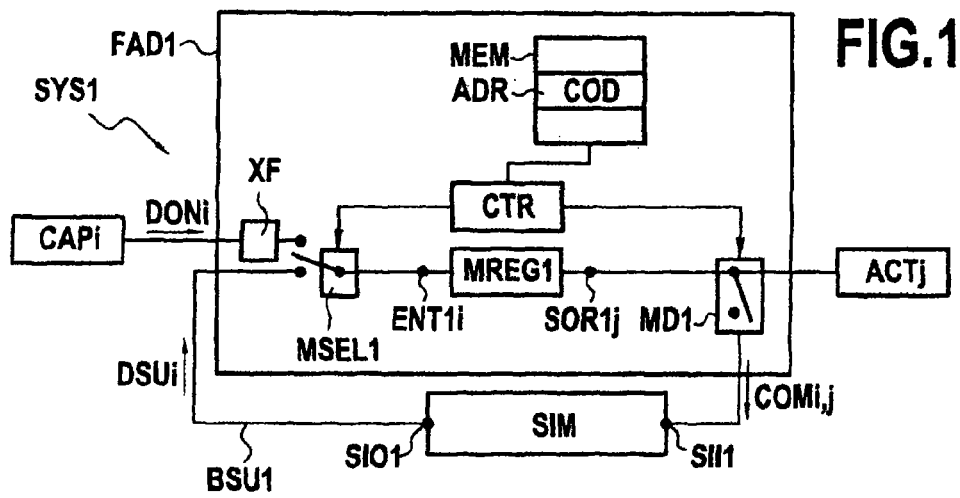
FIG. 1 shows a system in a first embodiment of the invention, the system having only one engine.

FIG. 1 shows a system SYS1 of the invention.

The system comprises a digital computer FAD1 suitable for controlling an engine MOT1 in an aircraft AER, the aircraft and the engine not being shown.

The computer FAD1 has a plurality of inputs $ENT1_i$, with only one of these inputs being shown in the figure.

Each of these inputs $ENT1_i$ is suitable for receiving digital data obtained by transforming analog data $DON_i$ representative of the state of a sensor $CAP_i$ of the engine MOT1 or of the aircraft AER.

This transformation is performed by a transformation module XF that includes in particular an analog-to-digital converter.

The digital computer FAD1 also has a plurality of outputs $SOR1_j$, only one of which is shown in the figure, each of the outputs $SOR1_j$ being connected to an actuator $ACT_j$ of the engine MOT1 or of the aircraft AER.

In accordance with the invention, the system SYS1 also includes a real time simulator SIM suitable for simulating at least some of the environment of the engine MOT1 and of the aircraft AER.

The simulator SIM has an output SIO1 connected to a digital bus BSU1 that is referred to as a substitution bus.

In accordance with the invention, the system SYS1 has a selection module MSEL1 suitable for switching the various inputs $ENT1_i$ of the digital computer FAD1 either to the sensors $CAP_i$ or to the substitution bus BSU1 that is connected to the real time simulator SIM.

Switching may be performed independently for each sensor $CAP_i$.

In the presently described embodiment, the digital computer FAD1 has a control and verification module CTR suitable for activating or deactivating the connection between the output $SOR1_j$ and an input SII1 of the digital simulator via a switch MD1.

In the presently described embodiment, the selection module MSEL1 is controlled by the control and verification module CTR on instruction from an operator.

Consequently, during simulation, the input $ENT1_i$ may receive:

either data $DON_i$ representative of the state of the sensor $CAP_i$; or else substitution digital data $DSU_i$ as generated by the real time simulator SIM.

The digital computer FAD1 has a regulation module MREG1 suitable for sending a command $COM_{i,j}$ via an output $SOR1_j$ to the actuator $ACT_j$ as a function of the data received on the input $ENT_i$, either coming from the sensor $CAP_i$ (after the analog data $DON_i$ has been converted to digital data), or else coming from the simulator SIM (data $DSU_i$).

The command $COM_{i,j}$ is received by the actuator $ACT_j$.

It is also received at the input SII1 of the real time simulator SIM if the switch MD1 is in the closed position.

In one utilization mode of the invention, the operator may order the digital computer FAD1 to take no account of any of the real sensors $CAP_i$. The failure reports associated with those sensors are then preferably masked.

In such an implementation, the digital computer FAD1 always attempts to actuate its outputs, but none of them is connected to the actuators $ACT_j$: the associated failure reports may be forced to "correct".

The command values are transmitted to the input SII1 of the real simulator SIM.

In this implementation, the real time simulator incorporates the computer model of the engine MOT1, and the computer model of the aircraft AER, and it possibly also takes charge of the real avionics, which avionics are not simulated.

In another implementation, the operator may order to digital computer FAD1 to take account of all of the sensors $CAP_i$ except for one, and it is only the failure reports associated with that one sensor that is masked.

Under such circumstances, the real time simulator incorporates at least simulation of that sensor.

The digital computer actuates its outputs to the actuators $ACT_j$ successfully, since the operator has indicated that all of the actuators $ACT_j$ are connected: no failure report is masked.

In the presently described embodiment of the invention, the values of the commands $COM_{i,j}$ sent to the actuators are transmitted optionally to the real time simulator SIM depending on the position of the switch MD1. During a simulation stage, all of the commands are transmitted to the real time simulator SIM, with these commands being used or not used by the simulator.

Figure 2:
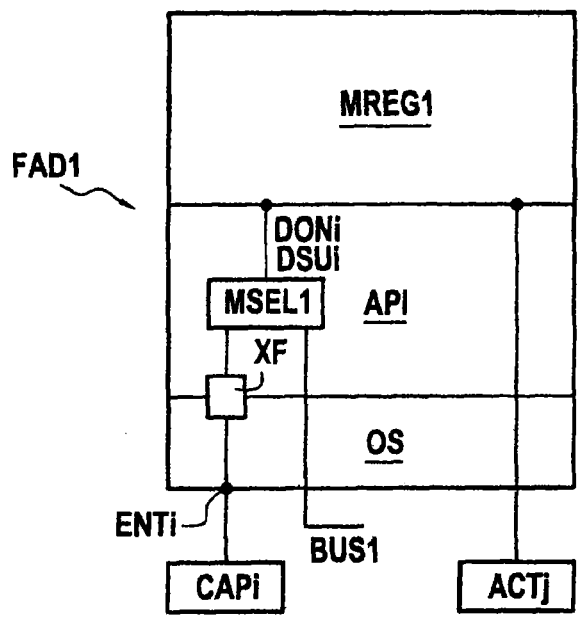
FIG. 2 is a diagram showing the software architecture of the digital computer in the FIG. 1 system.

FIG. 2 is a diagram showing the software layers implemented by the digital computer FAD1. This is a model having three layers, namely: a low layer OS comprising the operating system that manages amongst other things the various sensors $CAP_i$ and actuators $ACT_j$; a high layer MREG1 that implements the regulation module and that is suitable for generating the commands $COM_{i,j}$ for sending to the actuators $ACT_j$ as a function of the data received on the inputs $ENT1_i$; and an intermediate interface layer API between the regulation module MRG1 and the operating system OS, and in which the selection module MSEL1 is implemented.

Figure 3:
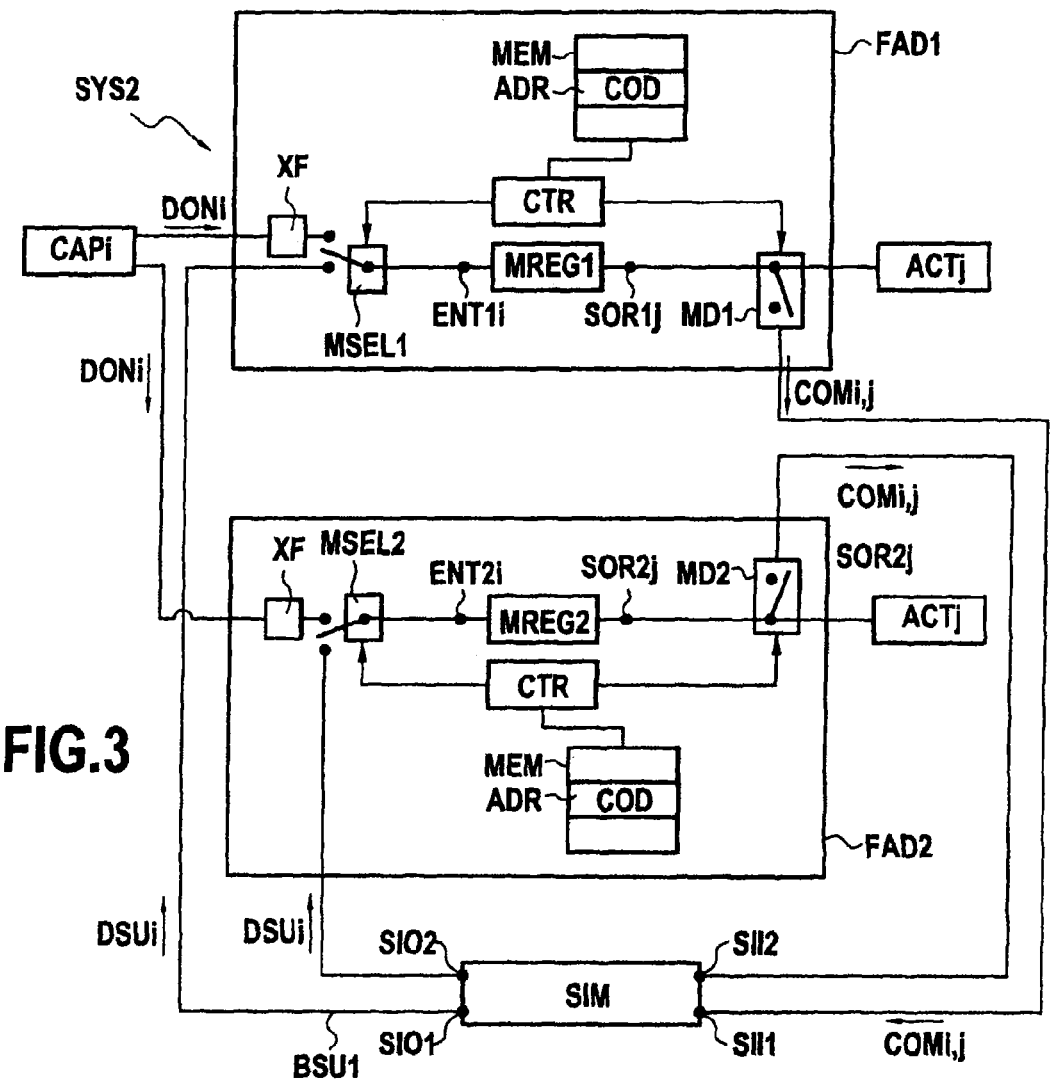
FIG. 3 shows a second system in accordance with the invention, this system having two engines.

FIG. 3 shows a system SYS2 in accordance with the invention, this system having two engines MOT1, MOT2 (not shown), each of them being controlled by a respective digital computer FAD1, FAD2.

Similar notation is used for the second computer FAD2.

The digital computers FAD1 and FAD2 are interconnected by an inter-computer connection LIF.

In the presently described embodiment, the real time simulator SIM incorporates computer models for both engines MOD1 and MOD2, and also for the aircraft AER.

In FIG. 3, the sensor $CAP_i$ may optionally be connected to each of the two digital computers FAD1 and FAD2, and each output $SOR1_j$, $SOR2_j$ may optionally be connected to the input SII1 or SII2 of the real time simulator SIM.

Naturally, certain sensors may be connected to only one of the two digital computers FAD1, FAD2.

In accordance with the invention, the digital computers FAD1, FAD2 are strictly identical during the stage of simulation and of developing the regulation modules MREG1, MREG2, and also while the aircraft is in use, i.e. in flight.

Naturally, for safety reasons, it is essential when the aircraft is in flight to prevent the simulation function from being activated.

Consequently, in each of the digital computers FAD1, FAD2, the verification means CTR implement a verification procedure for preventing the inputs $ENT1_i$, $ENT2_i$ from being switched to the substitution buses BSU1, BSU2 while the aircraft AER is in flight.

Figure 4:
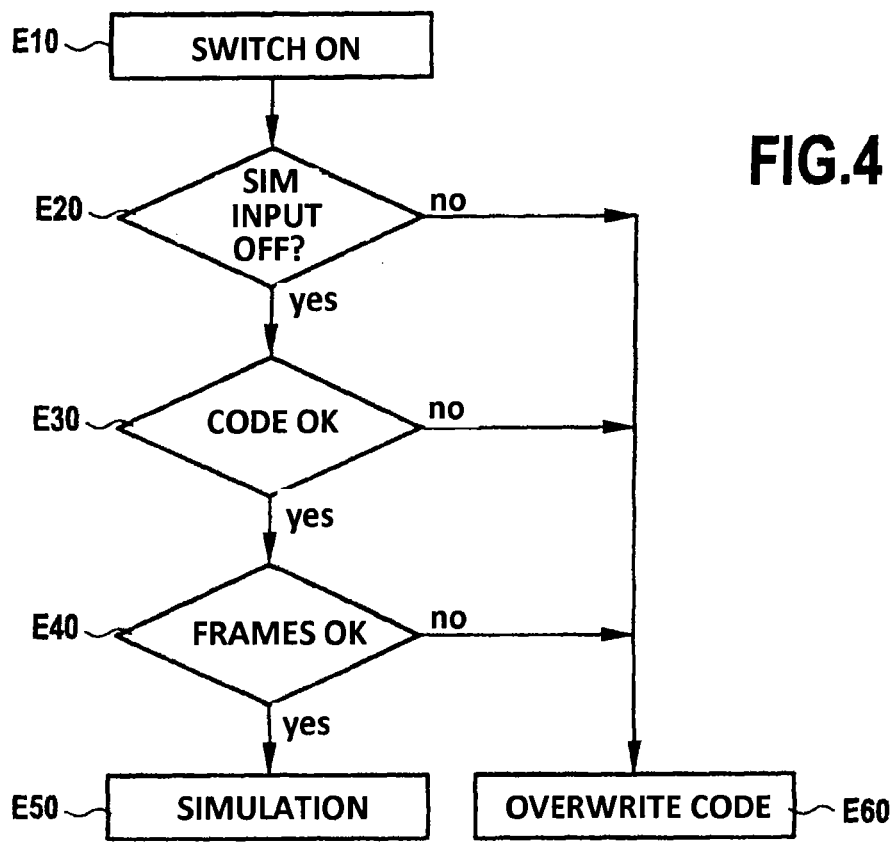
FIG. 4 is a flow chart showing the main steps of a verification implemented in the systems of FIGS. 1 and 3.

FIG. 4 shows an example of the verification procedure that can be implemented in a system in accordance with the invention.

After a computer FAD1, FAD2 has been switched on (step E10), this verification procedure has a step E20 during which it is verified that the inputs $ENT1_i$, $ENT2_i$ of these computers are not connected to the substitution buses BSU1, BSU2 of the real time simulator SIM, in other words it is verified that these inputs are indeed connected to the sensors $CAP_i$ of the engines or of the aircraft.

If so, the step E20 is followed by a step E30 during which each of the digital computers FAD1, FAD2 verifies that a determined address ADR of a memory MEM includes a determined value COD.

If it does, the step E30 is followed by a step E40 during which each of the digital computers FAD1, FAD2 waits for a predetermined frame sequence within a predetermined time.

If the sequence is received in time, i.e. if all three verification steps E20, E30, and E40 have been successful, it is possible to envisage performing simulation, i.e. the operator may indeed independently connect each of the inputs $ENT1_i$, $ENT2_i$ either to a real sensor $CAP_i$ or to the real time simulator SIM1 via the substitution buses BSU1, BSU2.

In the presently described implementation, if any one of the verification steps E20, E30, E40 fails, then the code COD at the address ADR in the memory MEM is overwritten.

This procedure is executed when the computer is switched on. It avoids any untimely activation of the simulation mode.

The invention claimed is:

1. A system comprising:
   at least one digital computer embedded in an aircraft and configured to control an engine in the aircraft, each digital computer comprising:
       at least one input configured to receive data representative of a state of a sensor of the engine or of the aircraft;
       at least one output configured to be connected to at least one actuator of the engine or of the aircraft; and
       a regulation module configured to generate at least one command and send the at least one command via the output to the at least one actuator as a function of data received by at least one input;
   the system further comprising:
   a selection module included in the at least one digital computer and configured to switch the input either to the sensor or else to a substitution bus as a function of an instruction from an operator;
   a real time simulator, embedded in the aircraft, for simulating at least some of an environment of the engine and of the aircraft, the simulator comprising:
       a digital output configured to send at least one substitution item of digital data generated by the real time simulator over the substitution bus to the input of the at least one digital computer, wherein the regulation module is configured to generate and send the at least one command via the at least one output to the at least one actuator as a function of the at least one substitution item of digital data; and
       a digital input connected to the at least one output of the digital computer and configured to receive the at least one command issued by the at least one digital computer, the real time simulator configured to simulate reaction of the engine and of the aircraft to the command; and
   a verification module included in the at least one digital computer, configured to implement a verification procedure for preventing the at least one input of the digital computer from being switched to the substitution bus by the selection module when the aircraft is in flight.

2. A system according to claim 1, wherein the selection module is implemented by a software module constituting an interface between the at least one input and the regulation module.

3. A system according to claim 1, further comprising means for connecting or disconnecting the output that is connected to the actuator to or from the input of the simulator.

4. A system according to claim 1, comprising two engines and two of the digital computers that are mutually interconnected by a physical connection, each of the computers configured to control one of the engines.

5. A system according to claim 1, wherein the verification procedure is implemented as soon as the at least one digital computer is switched on, the verification module configured to:
   verify that the input is switched to the sensor;
   verify a determined code in a determined address of a memory of the system; and
   verify that at least one determined frame is received in a determined time.

6. A system according to claim 5, wherein the verification module includes means for overwriting the code in event of at least one of the verification steps failing.

7. A system according to claim 1, wherein the substitution bus is a digital bus of a computer area network, Ethernet, or ARINC type.

* * * * *